United States Patent
Mamrak et al.

(10) Patent No.: US 11,318,535 B2
(45) Date of Patent: May 3, 2022

(54) METHOD FOR PROCESS CONTROL IN ADDITIVE MANUFACTURING

(71) Applicant: General Electric Company, Schenectady, NY (US)

(72) Inventors: Justin Mamrak, Loveland, OH (US); Andrew J. Martin, Blue Ash, OH (US); Mackenzie Ryan Redding, Mason, OH (US)

(73) Assignee: General Electric Company, Schenectady, NY (US)

( * ) Notice: Subject to any disclaimer, the term of this patent is extended or adjusted under 35 U.S.C. 154(b) by 649 days.

(21) Appl. No.: 15/390,133

(22) Filed: Dec. 23, 2016

(65) Prior Publication Data

US 2018/0178287 A1  Jun. 28, 2018

(51) Int. Cl.
| | | |
|---|---|---|
| *B22F 3/105* | (2006.01) | |
| *B33Y 10/00* | (2015.01) | |
| *B33Y 50/02* | (2015.01) | |
| *B23K 26/342* | (2014.01) | |
| *B23K 26/14* | (2014.01) | |
| *B23K 26/70* | (2014.01) | |
| *B22F 10/20* | (2021.01) | |
| *B23K 26/144* | (2014.01) | |
| *B29C 64/371* | (2017.01) | |
| *B29C 64/393* | (2017.01) | |
| *B29C 64/153* | (2017.01) | |
| *B22F 10/30* | (2021.01) | |

(52) U.S. Cl.
CPC ............ *B22F 10/20* (2021.01); *B23K 26/144* (2015.10); *B23K 26/1437* (2015.10); *B23K 26/342* (2015.10); *B23K 26/70* (2015.10); *B29C 64/153* (2017.08); *B29C 64/371* (2017.08); *B29C 64/393* (2017.08); *B33Y 10/00* (2014.12); *B33Y 50/02* (2014.12); *B22F 10/30* (2021.01); *B22F 2203/11* (2013.01); *B22F 2998/10* (2013.01); *B22F 2999/00* (2013.01); *Y02P 10/25* (2015.11)

(58) Field of Classification Search
None
See application file for complete search history.

(56) References Cited

U.S. PATENT DOCUMENTS

| | | |
|---|---|---|
| 5,669,979 A | 9/1997 | Elliot et al. |
| 7,105,205 B2 | 9/2006 | Clayton et al. |
| 8,404,998 B2 | 3/2013 | Unrath et al. |
| 8,797,531 B2 | 8/2014 | Knox et al. |
| 9,132,585 B2 | 9/2015 | Miller et al. |
| 2011/0174786 A1 | 7/2011 | Lefebvre et al. |
| 2015/0004046 A1 | 1/2015 | Graham et al. |
| 2015/0084238 A1 | 3/2015 | Bonassar et al. |
| 2015/0198052 A1 | 7/2015 | Pavlov et al. |
| 2015/0321422 A1 | 11/2015 | Boyer |
| 2016/0214907 A1 | 7/2016 | Shim et al. |
| 2016/0236279 A1 | 8/2016 | Ashton et al. |
| 2016/0236414 A1 | 8/2016 | Reese et al. |
| 2016/0236416 A1 | 8/2016 | Bheda et al. |
| 2016/0250714 A1 | 9/2016 | Zhang et al. |
| 2018/0043432 A1 | 2/2018 | Domrose |
| 2018/0126650 A1* | 5/2018 | Murphree ............ B29C 64/245 |
| 2018/0154484 A1 | 6/2018 | Hall |

OTHER PUBLICATIONS

International Search Report and Written Opinion issued in connection with corresponding PCT Application No. PCT/US2017/062934 dated Apr. 12, 2018.
Król et al, "Surface quality in selective laser melting of metal powders", Archives of Materials Science and Engineering, vol. 60 Issue 2, Apr. 2013, pp. 87-92.

* cited by examiner

*Primary Examiner* — Anthony M Liang
(74) *Attorney, Agent, or Firm* — Dority & Manning, P.A.

(57) ABSTRACT

A method is provided for controlling an additive manufacturing process in which one or more energy beams are used to selectively fuse a powder contained in an additive manufacturing machine having a gas flow therein in order to form a workpiece, in the presence of one or more plumes generated by interaction of the one or more energy beams with the powder, wherein the process is controlled by an electronic controller. The method includes: performing a build process to form a workpiece using a set of initial process parameters; sensing a condition of the finished workpiece; using the electronic controller, comparing the condition of the finished workpiece to a predetermined standard; using the electronic controller, changing one or more of the initial process parameters to define a set of revised process parameters; and performing a subsequent build process using the revised process parameters.

14 Claims, 11 Drawing Sheets

FIG. 11

METHOD FOR PROCESS CONTROL IN ADDITIVE MANUFACTURING

BACKGROUND OF THE INVENTION

This invention relates generally to additive manufacturing, and more particularly to methods for automated process control in additive manufacturing.

Additive manufacturing is a process in which material is built up layer-by-layer to form a component. Additive manufacturing is also referred to by terms such as "layered manufacturing," "reverse machining," "direct metal laser melting" (DMLM), and "3-D printing". Such terms are treated as synonyms for purposes of the present invention.

One type of additive manufacturing machine is referred to as a "powder bed" machine and includes a build chamber that encloses a mass of powder which is selectively fused by a radiant energy beam to form a workpiece. The build chamber is enclosed in a housing that typically includes provisions for a flow of shielding gas therein. The shielding gas is used to transfer heat away from the surface of the powder bed, to prevent vaporized powder from condensing on the surface of the workpiece, and to control undesired chemical reactions, such as oxidation.

Workpiece quality is dependent on multiple process parameters such as beam settings, gas flow rates, etc. Furthermore, the interaction of the energy beam with the powder generates an emissions plume which can cause detrimental effects on the build process.

In the prior art, the iterative process for addressing process parameter non-conformance or build problems employs data collected after-the-fact, and includes a human-in-the-loop making specific decisions which are then tested for further iteration. This process is subject to human error and is inherently more time and labor consuming than an automated process.

BRIEF DESCRIPTION OF THE INVENTION

This problem by an integrated process control method which includes using software with multiple sources of data to understand the build process and to leverage learning from one build to optimize subsequent builds in an automated process.

According to one aspect of the technology described herein, a method is provided for controlling an additive manufacturing process in which one or more energy beams are used to selectively fuse a powder contained in an additive manufacturing machine having a gas flow therein in order to form a workpiece, in the presence of one or more plumes generated by interaction of the one or more energy beams with the powder, wherein the process is controlled by an electronic controller. The method includes: performing a build process to form a workpiece using a set of initial process parameters; sensing a condition of the finished workpiece; using the electronic controller, comparing the condition of the finished workpiece to a predetermined standard; using the electronic controller, changing one or more of the initial process parameters to define a set of revised process parameters; and performing a subsequent build process using the revised process parameters.

According to another aspect of the technology described herein, a method is provided for making a workpiece, including: depositing a powdered material in a build chamber disposed in a housing, while using a gas flow apparatus coupled in fluid communication with the housing to provide a gas flow over the powder; in the presence of the gas flow, directing one or more energy beams to selectively fuse the powdered material in a pattern corresponding to a cross-sectional layer of the workpiece, wherein interaction of the one or more energy beams with the powdered material generates one or more plumes entrained in the gas flow, wherein the build process is conducted using a set of initial process parameters; sensing a condition of the finished workpiece; using an electronic controller, comparing the condition of the finished workpiece to a predetermined standard; using the electronic controller, changing one or more of the initial process parameters to define a set of revised process parameters; and repeating the steps of fusing the powdered material to make a workpiece, using the revised process parameters.

BRIEF DESCRIPTION OF THE DRAWINGS

The invention may be best understood by reference to the following description taken in conjunction with the accompanying drawing figures in which.

DETAILED DESCRIPTION OF THE INVENTION

Figure 1:
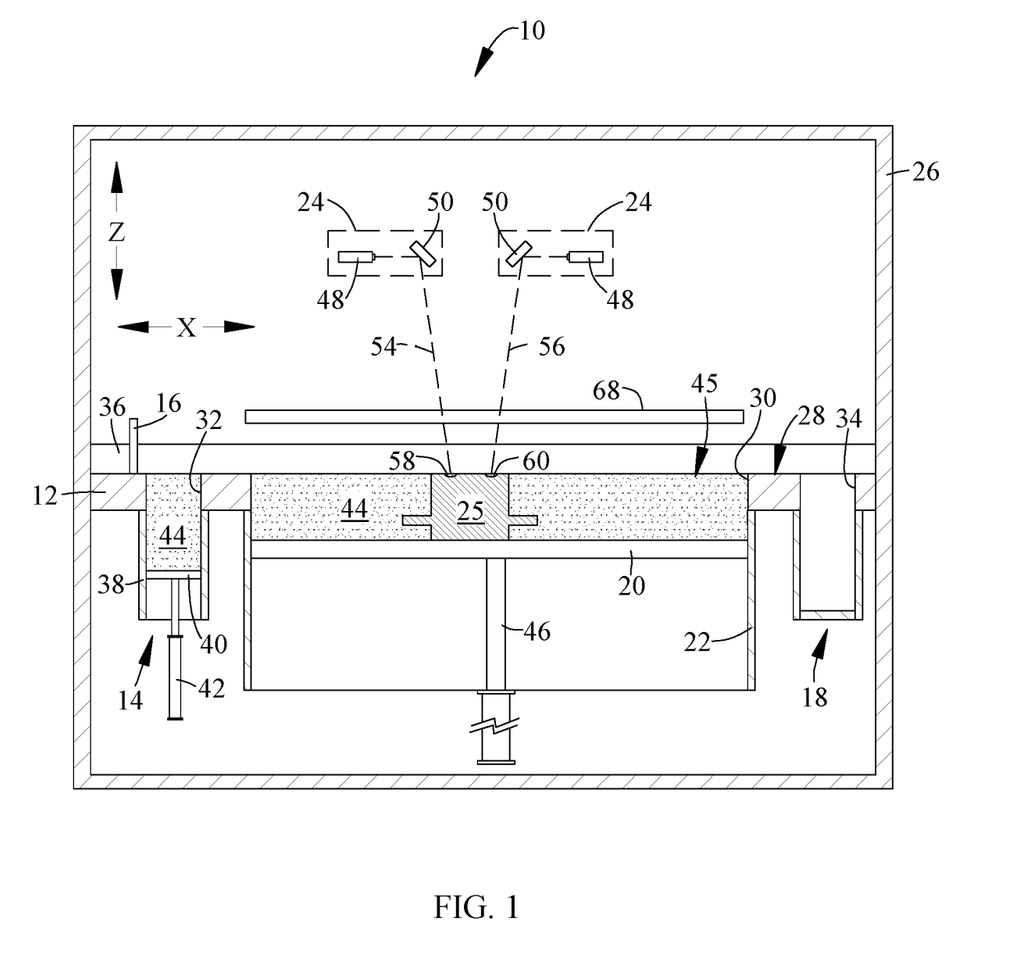
FIG. 1 is a schematic, partially-sectioned front elevation view of an exemplary additive manufacturing machine including a build chamber therein.

Referring to the drawings wherein identical reference numerals denote the same elements throughout the various views, FIG. 1 illustrates schematically an additive manufacturing machine 10 suitable for carrying out an additive manufacturing method. Basic components of the machine 10 include a table 12, a powder supply 14, a recoater 16, an overflow container 18, a build platform 20 surrounded by a build chamber 22, and at least one beam generator 24, all surrounded by a housing 26. Each of these components will be described in more detail below.

The table 12 is a rigid structure defining a planar worksurface 28. The worksurface 28 is coplanar with and defines a virtual workplane. In the illustrated example it includes a build opening 30 communicating with the build chamber 22 and exposing the build platform 20, a supply opening 32 communicating with the powder supply 14, and an overflow opening 34 communicating with the overflow container 18.

The recoater 16 is a rigid, laterally-elongated structure that lies on the worksurface 28. It is connected to an actuator 36 operable to selectively move the recoater 16 along the worksurface 28. The actuator 36 is depicted schematically in FIG. 1, with the understanding devices such as pneumatic or hydraulic cylinders, ballscrew or linear electric actuators, and so forth, may be used for this purpose.

The powder supply 14 comprises a supply container 38 underlying and communicating with the supply opening 32, and an elevator 40. The elevator 40 is a plate-like structure that is vertically slidable within the supply container 38. It is connected to an actuator 42 operable to selectively move the elevator 40 up or down. The actuator 42 is depicted schematically in FIG. 1, with the understanding that devices such as pneumatic or hydraulic cylinders, ballscrew or linear electric actuators, and so forth, may be used for this purpose. When the elevator 40 is lowered, a supply of powder 44 of a desired composition (for example, metallic, ceramic, polymeric, and/or organic powder) may be loaded into the supply container 38. When the elevator 40 is raised, it exposes the powder 44 above the worksurface 28. Other types of powder supplies may be used; for example powder may be dropped into the build chamber 22 by an overhead device (not shown).

The build platform 20 is a plate-like structure that is vertically slidable below the build opening 30. It is connected to an actuator 46 operable to selectively move the build platform 20 up or down. The actuator 46 is depicted schematically in FIG. 1, with the understanding that devices such as pneumatic or hydraulic cylinders, ballscrew or linear electric actuators, and so forth, may be used for this purpose. When the build platform 20 is lowered into the build chamber 22 during a build process, the build chamber 22 and the build platform 20 collectively surround and support a mass of powder 44 along with any components being built. This mass of powder is generally referred to as a "powder bed", and this specific category of additive manufacturing process may be referred to as a "powder bed process".

The overflow container 18 underlies and communicates with the overflow opening 34, and serves as a repository for excess powder 44.

The apparatus 10 incorporates at least one beam generator 24 operable to generate an energy beam and direct it as desired. As will be explained in more detail below, multiple beam generators 24 may be provided and used simultaneously in order to increase this production speed of the apparatus 10. In the illustrated example, two beam generators 24 are shown.

Each beam generator 24 includes a directed energy source 48 and a beam steering apparatus 50. The directed energy source 48 may comprise any device operable to generate a beam of suitable power and other operating characteristics to melt and fuse the powder 44 during the build process, described in more detail below. For example, the directed energy source 48 may be a laser. Other directed-energy sources such as electron beam guns are suitable alternatives to a laser.

The beam steering apparatus 50 may include one or more mirrors, prisms, and/or lenses and provided with suitable actuators, and arranged so that a beam from the directed energy source 48 can be focused to a desired spot size and steered to a desired position in plane coincident with the worksurface 28. For purposes of convenient description, this plane may be referred to as a X-Y plane, and a direction perpendicular to the X-Y plane is denoted as a Z-direction (X, Y, and Z being three mutually perpendicular directions). The beam may be referred to herein as a "build beam".

In the illustrated example, one of the beam generators 24 is operable to generate a first build beam 54, and the other of the beam generators 24 is operable to generate a second build beam 56.

An exemplary basic build process for a workpiece 25 using the apparatus described above is as follows. The build platform 20 is moved to an initial high position. The build platform 20 is lowered below the worksurface 28 by a selected layer increment. The layer increment affects the speed of the additive manufacturing process and the resolution of the workpiece 25. As an example, the layer increment may be about 10 to 50 micrometers (0.0003 to 0.002 in.). Powder 44 is then deposited over the build platform 20 for example, the elevator 40 of the supply container 38 may be raised to push powder through the supply opening 32, exposing it above the worksurface 28. The recoater 16 is moved across the worksurface to spread the raised powder 44 horizontally over the build platform 20. Any excess powder 44 drops through the overflow opening 34 into the overflow container 18 as the recoater 16 passes from left to right. Subsequently, the recoater 16 may be moved back to a starting position. The leveled powder 44 may be referred to as a "build layer" and the exposed upper surface thereof may be referred to as a "build surface", designated 45.

One or more of the beam generators 24 are used to melt a two-dimensional cross-section or layer of the workpiece 25 being built. Within the beam generator 24, the directed energy source 48 emits a beam and the beam steering apparatus 50 is used to steer a focal spot of the build beam over the exposed powder surface in an appropriate pattern. A small portion of exposed layer of the powder 44 surrounding the focal spot, referred to herein as a "melt pool" is heated by the build beam to a temperature allowing it to sinter or melt, flow, and consolidate. This step may be referred to as "fusing" the powder 44. As an example, the melt pool may be on the order of 100 micrometers (0.004 in.) wide. In the illustrated example using two beam generators 24, the first build beam 54 generates a first melt pool 58 and the second build beam 56 generates a second melt pool 60.

The build platform 20 is moved vertically downward by the layer increment, and another layer of powder 44 is applied in a similar thickness. The beam generators 24 again emit build beams 54, 56 and the beam steering apparatus 50 is used to steer the focal spots of the build beams 54, 56 over the exposed powder surface in an appropriate pattern. The exposed layer of the powder 44 is heated by the build beams 54, 56 to a temperature allowing it to fuse as described above, and consolidate both within the top layer and with the lower, previously-solidified layer.

This cycle of moving the build platform 20, applying powder 44, and then directed energy fusing the powder 44 is repeated until the entire workpiece 25 is complete. The complete process of forming the workpiece 25 may be referred to as "a build".

The machine 10 and its operation are as representative example of a "powder bed machine". It will be understood that the principles described here are applicable to other configurations of powder bed machines.

The housing 26 serves to isolate and protect the other components of the machine 10. During the build process described above, the housing 26 is provided with a flow of an appropriate shielding gas which, among other functions, excludes oxygen from the build environment. To provide this flow the machine 10 may be coupled to a gas flow apparatus 62, seen in FIG. 2. The exemplary gas flow apparatus 62 includes, in serial fluid flow communication, a variable-speed fan 64, a filter 66, an inlet duct 68 communicating with the housing 26, and a return duct 70 communicating with the housing 26. All of the components of the gas flow apparatus 62 are interconnected with suitable ducting and define a gas flow circuit in combination with the housing 26.

Figure 2:
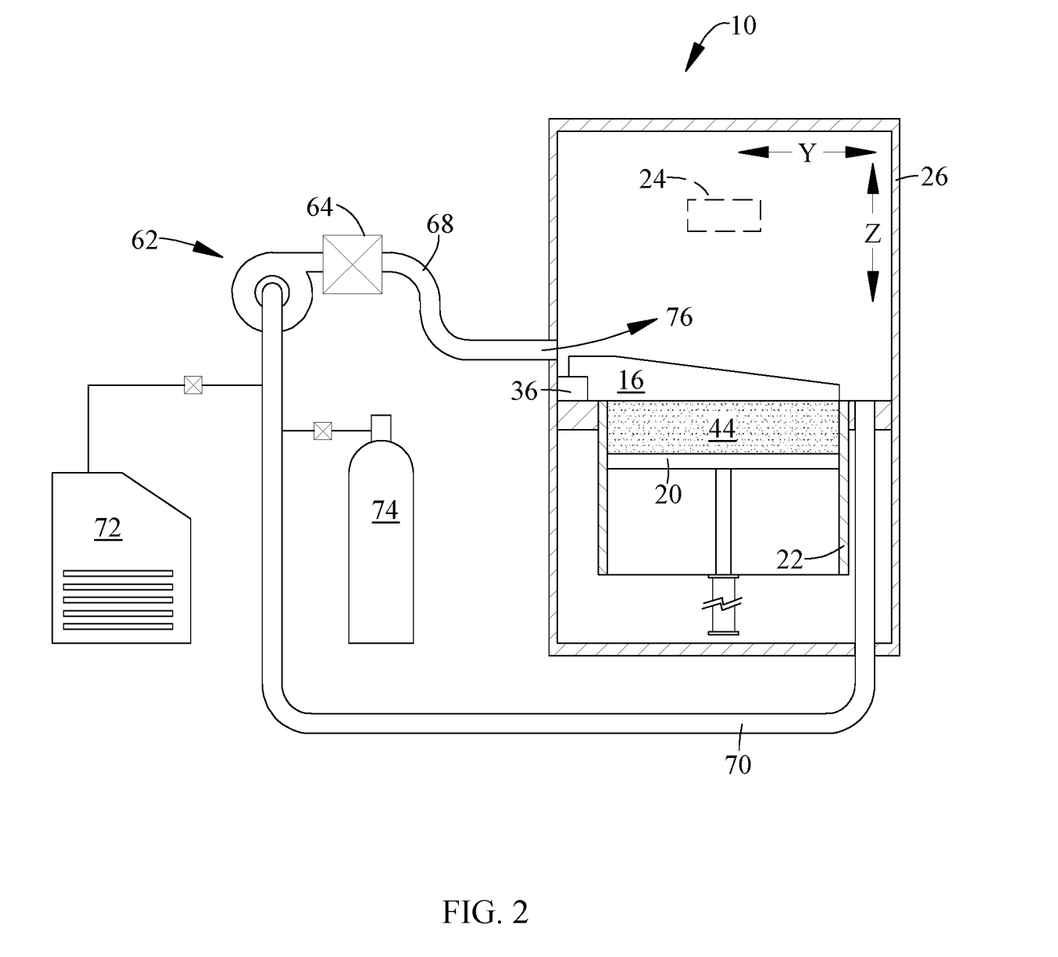
FIG. 2 is a schematic, partially-sectioned side elevation view of the machine of FIG. 1.

The composition of the gas used may similar to that used as shielding gas for conventional welding operations. For example, gases such as nitrogen, argon, or mixtures thereof may be used. Any convenient source of gas may be used. For example, if the gas is nitrogen, a conventional nitrogen generator 72 may be connected to the gas flow apparatus 62. Alternatively, the gas could be supplied using one or more pressurized cylinders 74.

Once the gas flow apparatus 62 and machine 10 are initially purged with gas, the fan 64 is used to recirculate the gas through the gas flow circuit in a substantially closed loop, so as to maintain the positive pressure described above, with additional added makeup gas added as needed. Increasing the fan speed increases the velocity and flow rate of gas in the gas flow circuit; conversely, decreasing the fan speed decreases the velocity and flow rate of gas in the gas flow circuit. As an alternative to recirculation, the gas flow apparatus 62 could operate in a total loss mode; for example instead of the gas flowing through the return duct 70 and back to the fan 64, it could simply be vented to atmosphere after passing over the build chamber 22. In the illustrated example, the thermal mass of the gas provides a heat transfer function, however an optional heat exchanger (not shown) could be incorporated into the gas flow apparatus 62.

Figure 3:
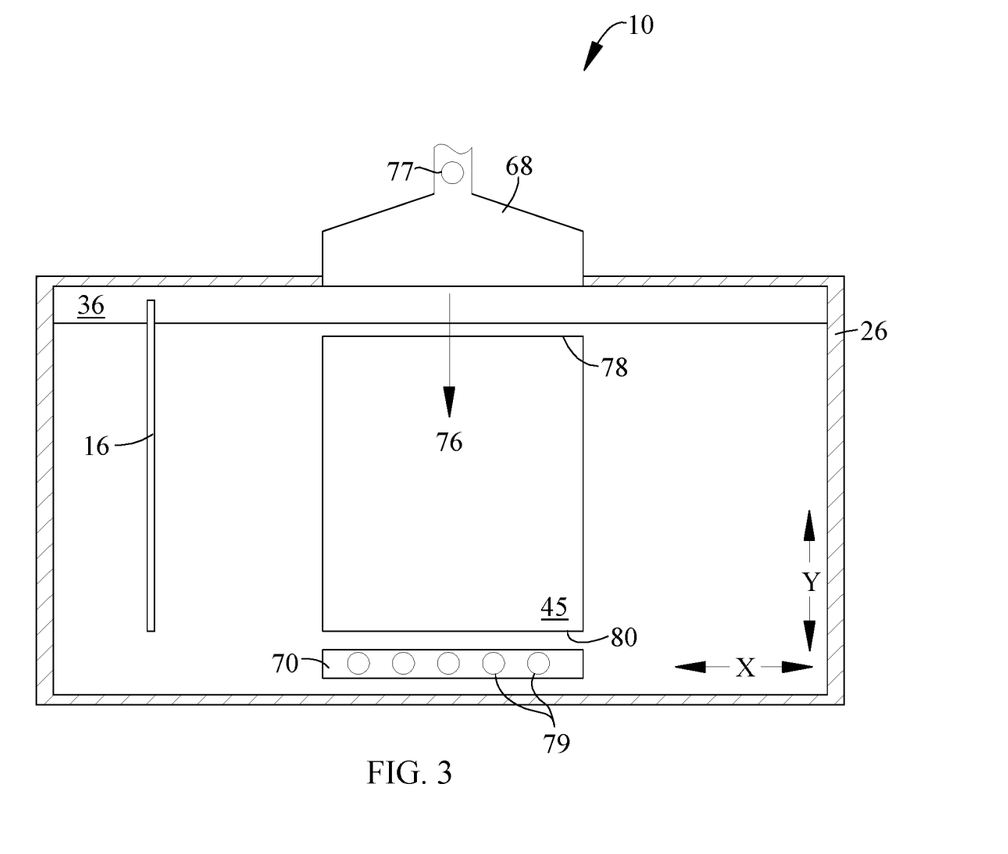
FIG. 3 is a schematic, partially-sectioned top plan view of the machine of FIG. 1.

The inlet duct 68 is positioned near the bottom of the housing 26. During operation it provides a stream or flow of gas (see arrow 76). As seen in FIG. 1, the inlet duct 68 has an elongated shape (for example rectangular) and discharges gas across the width of the build chamber 22. For reference purposes the width of the build chamber 22 may be considered parallel to the "X" direction. As shown in FIG. 3, the edge of the build chamber 22 closest to the upper inlet duct 68 is referred to as a "leading edge" 78, and the opposite parallel edge is referred to as a "trailing edge" 80. For reference purposes the length of the build chamber (i.e. distance from leading edge 78 to trailing edge 80) may be considered parallel to the "Y" direction.

The gas flow 76 has two functions. First, it is used to effect heat transfer and carry heat away from the surface of the uppermost built layer within the build chamber 22. Second, during the build process, some of the powder 44 is vaporized. This vapor can cool and condense on the surface of the workpiece 25, in turn causing an undesirable surface roughness or "recast" layer. Part of the gas flow 76 is used to carry away the vapors and/or condensate.

Means may be provided for monitoring the gas flow, such as one or more flow rate sensors. FIG. 3 shows an exemplary flow rate sensor 77 positioned in the inlet duct 68, and an array of flow rate sensors 79 positioned in the return duct 70. The sensors and 77 and 79 may provide simple flow rate information and/or particularized flow rate information for specific areas of the build surface 45.

Figure 4:
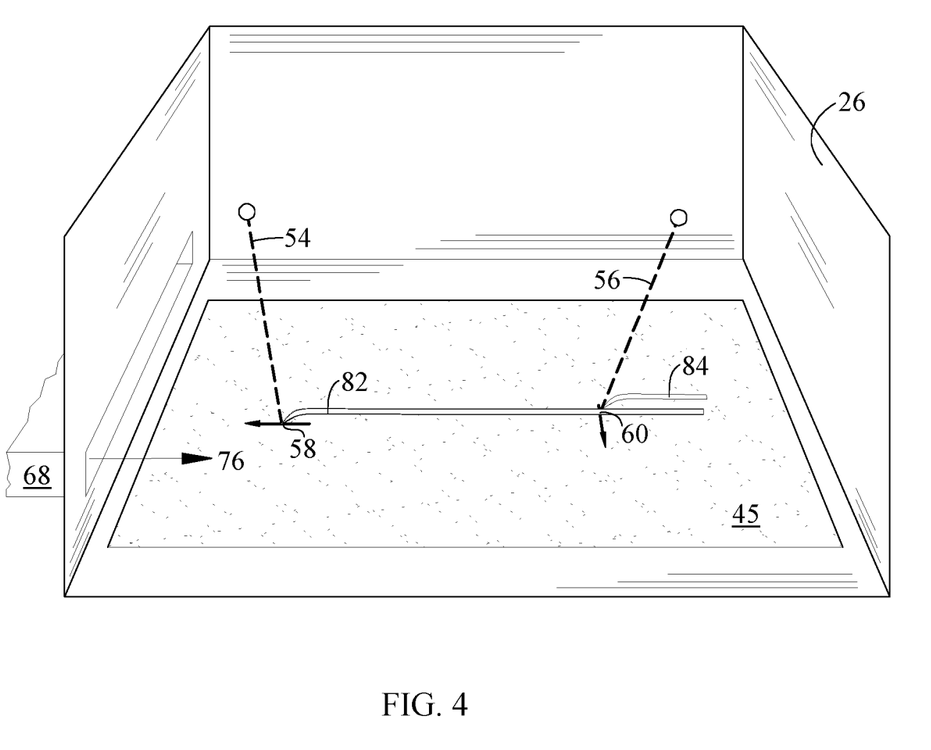
FIG. 4 is a schematic perspective view of an additive manufacturing build chamber showing a build process using two energy beams, with one beam intersecting a plume generated by the other beam.

In operation, the interaction of the build beams 54, 56 with the powder 44 causes heating and vaporization of the powder 44. As shown in FIG. 4, this generates first and second "plumes" 82, 84 respectively which originate in the vicinity of the melt pools 58, 60 and travel downstream, entrained in the gas flow 76. In the immediate vicinity of the melt pools 58, 60 the composition of the plumes 82, 84 respectively is mostly vaporized powder. At downstream locations, the vapor can cool and condense so that the plumes 82, 84 comprises a mixture of gas and metallic particles.

It will be understood that, so long as one of the build beams 54, 56 contacts the powder 44 at a location upstream of the other build beam 54, 56 relative to gas flow 76, there is a potential for an intersection of one of the build beams 54, 56 with one of the plumes 82, 84. It will further be understood that the build beams 54, 56 described above typically can be scanned or positioned across the build surface 45 faster than the plumes 82, 84 travel, thus creating the potential for the build beam 54, 56 to intersect its own plume 82, 84.

When one of the build beams 54, 56 intersects a plume 82, 84, the presence of the condensate can have numerous detrimental effects, for example blockage of the build beam 54, 56 and/or reduced beam intensity. These effects can be inconsistent because the condensate is scintillating. Accordingly, it is desirable to conduct the build process in such a manner that neither of the build beams 54, 56 passes through either of the plumes 82, 84. Several techniques for avoiding these intersections are described below.

To enable the beam/plume avoidance techniques and process control techniques described elsewhere herein, it is desirable to quantify the behavior of the plumes 82, 84. In particular, it is desirable to create a "plume map" describing the location and dimensions of each plume 82, 84 in 3-D space for any given time, and the propagation of the plumes 82, 84 over time. This process may also be described as determining the trajectory of the plumes 82, 84. Several methods will be described for characterizing the plumes 82, 84. For the purposes of convenient description, this will be described using plume 82 as an example with the understanding that the same methods may be used for plume 84 or for any additional plume, where multiple energy beams are used.

One possible method for characterizing the plume 82 involves modeling the plume 82. This may be done for example, using a commercially available computational fluid dynamics ("CFD") software package. The inputs to the software include, but are not limited to, the aerodynamic and thermal characteristics of the shielding gas flow 76 and the aerodynamic and thermal characteristics of the plume generation and propagation process. The inputs may take into consideration factors such as: air flow rates, energy beam intensity and focus, consolidated or unconsolidated powdered material composition and physical characteristics, melt pool dimensions and thermal characteristics, the type of fusing process (e.g. heating, melting, or sintering), and the composition of the plume (e.g. gases/and/or metal alloys). The CFD software is then capable of producing as an output the above-mentioned plume map.

Another possible method for characterizing the plume 82 involves sensing the plume 82. Any flow visualization technique capable of distinguishing the plume 82 from the gas flow 76 may be used for this purpose.

For example, an illumination source may be provided to illuminate the plume 82 in concert with one or more sensors to detect light scattered or reflected from the plume 82. Nonlimiting examples of suitable illumination sources include: a laser operated at a low output wattage (such as the beam generators 24); one or more additional dedicated low-power lasers (shown schematically at 85 in FIG. 5), a supplementary light-emitting diode ("LED"), or a chamber light in an appropriate wavelength (e.g. infrared or visible). Both backscatter and forward scatter sensing techniques may be used, and multiple images from multiple sensors may be combined to generate a 3-D plume map.

Figure 5:
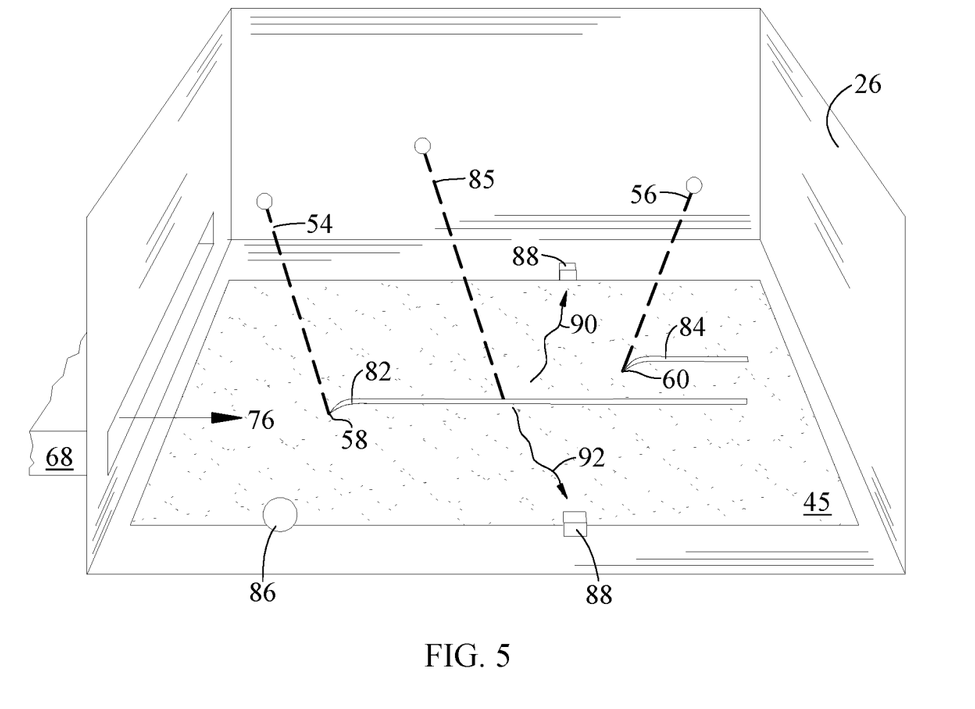
FIG. 5 is a schematic perspective view of an additive manufacturing build chamber showing a build process using two energy beams, with sensors positioned around the build chamber to detect plumes generated by the beams.

In the example shown in FIG. 5, an illumination source 86 (shown schematically) is provided at a fixed location within the housing 26. Sensors 88 are provided within the housing 26 with a clear field of view of the build surface 45. Each sensor 88 is sensitive to forward scattered light 90 or backward scattered light 92. The sensors 88 are of a type and configured such that they can produce a signal representative of the position of the plume 82. For example, they may be imaging sensors, or a plurality of simpler sensors arranged in an X-Y array may be provided in order to provide positional reference. The pattern of signals from the sensors 88 is indicative of the location of the plume 82.

The sensors 88 may be used to generate a plume map in real time as the build process proceeds. Alternatively, the sensors 88 could be used as part of an empirical method of characterizing the plume 82. Initially, a test build would be performed using a nominal set of operating parameters, without any effort to avoid beam-plume interactions. The sensors 88 would be used to create a plume map as described above. In a second iteration, the plume map would be used to implement changes in the build parameters using one or more of the beam-plume avoidance methods described below. The sensors 88 could be used again to determine the effectiveness of the changes. A series of iterations may be performed until the operating parameters result in minimal beam-plume interactions. Once this set of iterations is complete, subsequent builds could be performed in an open loop using the optimized set of operating parameters.

Using the information provided by one or more of the methods described above of characterizing the plume, the machine 10 may be controlled in such a way as to prevent undesirable interaction between the build beams 54, 56 and the plumes 82, 84.

Several of these avoidance techniques involve controlling the build beams 54, 56 with reference to the plume maps described above.

Figure 6:
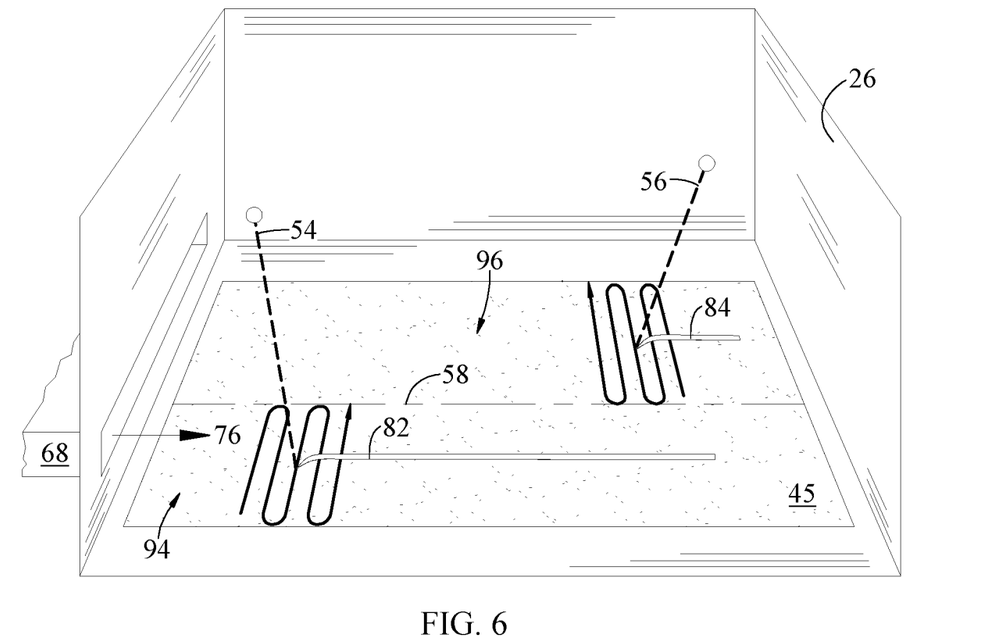
FIG. 6 is a schematic perspective view of an additive manufacturing build chamber showing a build process using two energy beams, wherein each of the beams is steered to avoid a plume generated by other beam.

For example, one possible method involves controlling the operation of the beam generators 24 so that the build beams 54, 56 do not interact with the plumes 82, 84 by dividing the build surface 45 into virtual zones. Referring to FIG. 6, the build surface 45 is virtually divided into first and second zones 94, 96 by a virtual boundary 98 extending parallel to the direction of the gas flow 76 (i.e. parallel to the Y-direction). In operation, the build beam 54 is limited to operation within the first zone 94 and the build beam 56 is limited to operation within the second zone 96. Using this method, it can be seen that the plume 82 from the first build beam 54 would inherently remain clear of the second build beam 56 and the plume 84 from the second build beam 56 would remain clear of the first build beam 54. Furthermore, each build beam 54, 56 would remain clear of its respective plume 82, 84 so long as the build beam 54, 56 consistently scans in the upstream direction relative to the gas flow 76.

Figure 7:
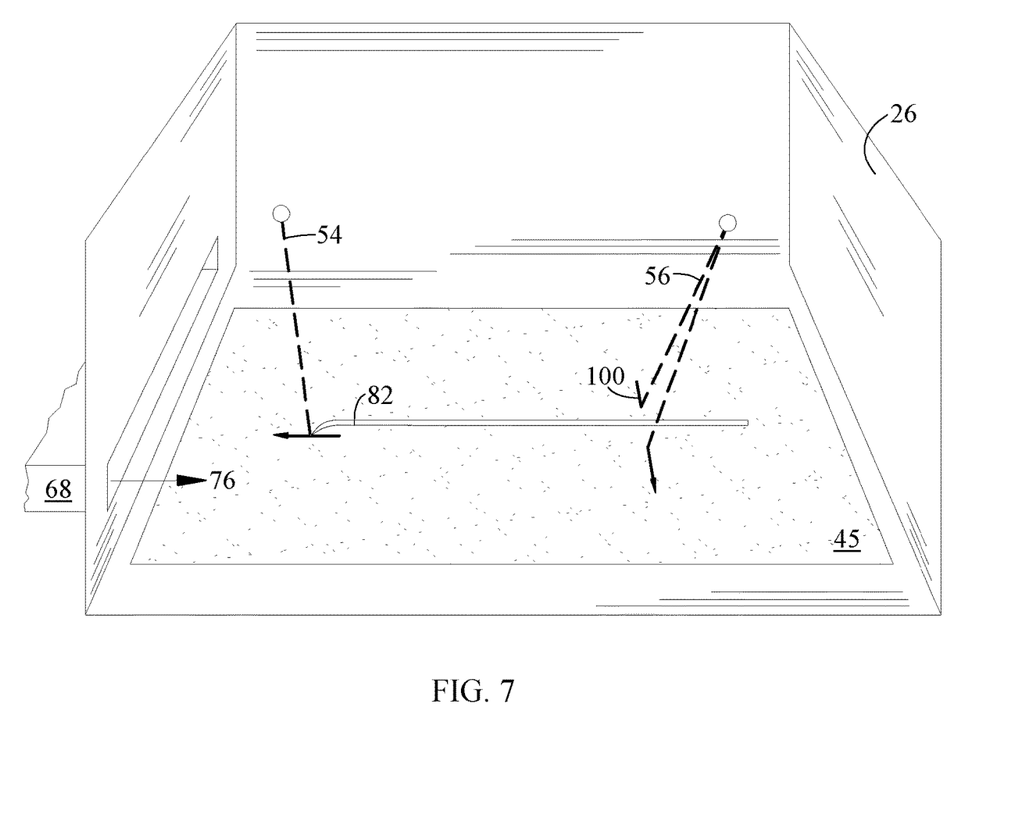
FIG. 7 is a schematic perspective view of an additive manufacturing build chamber showing a build process using two energy beams, with a path of a second energy beam steered to avoid a plume generated by the first beam.

Another possible method involves controlling the operation of the beam generators 24 so that the build beams 54, 56 are diverted away from or "skip over" the plumes 82, 84. Referring to FIG. 7, build beam 54 is shown generating plume 82 and build beam 56 is shown traversing an intended path 100 which would intersect the plume 82. Using this method, the build beam 56 would be momentarily shut off at the point of predicted intersection with the plume 82, and then restarted to continue following the intended path 100 on the opposite side of the plume 82 (or possibly steered in a path completely avoiding the plume 82). The remaining portion of the path 100 may then be fused at a subsequent time after the plume 82 has moved away. Alternatively, the build beam 56 could be "skipped" away from its nominal path only when an actual intersection has been detected.

Figure 8:
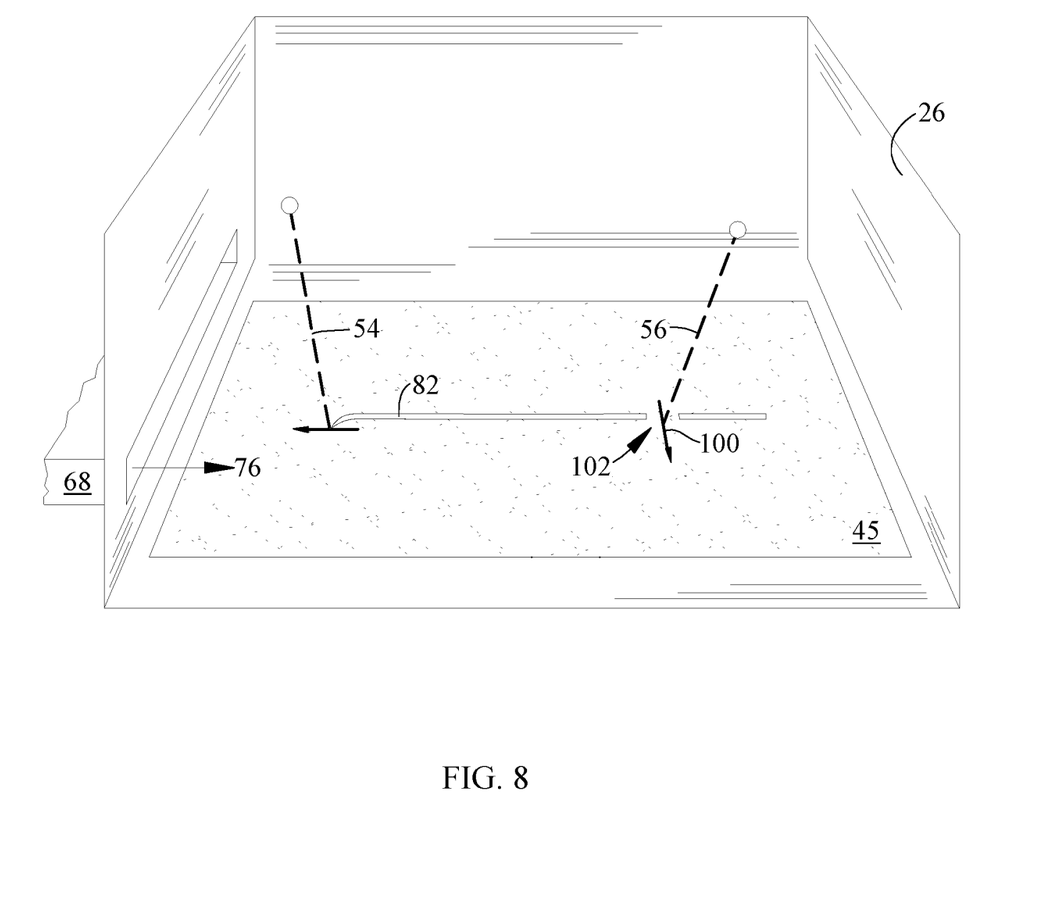
FIG. 8 is a schematic perspective view of an additive manufacturing build chamber showing a build process using two energy beams, with a gap created in a plume generated by the first beam to permit the second beam to pass therethrough.

Another possible method involves coordinating the operation of the beam generators 24 so that the plume generation is momentarily interrupted providing a gap for a build beam. Referring to FIG. 8, build beam 54 is shown generating a plume 82 and build beam 56 is shown traversing an intended path 100 which would intersect the plume 82. Using this method, the build beam 54 would be momentarily shut off at the time of predicted intersection, thus creating a gap 102 in the plume 82. The build beam 56 may then traverse the intended path 100 without interruption. The build beam 54 may then be restarted to continue working.

Any of these techniques may be implemented using a single beam generator 24 or multiple beam generators 24.

Alternatively or in addition to the build beam control techniques described above, control or modification of the plume trajectory may be used to prevent undesirable interaction between the build beams 54, 56 and the plumes 82, 84.

One possible method involves varying the magnitude of the gas flow 76, for example by varying the speed of the fan 64. This will cause the plumes 82, 84 to propagate at lower or higher velocities, depending on the speed variation. As a result, this can provide some control over the location of the plumes 82, 84 at a given point in time.

Figure 9:
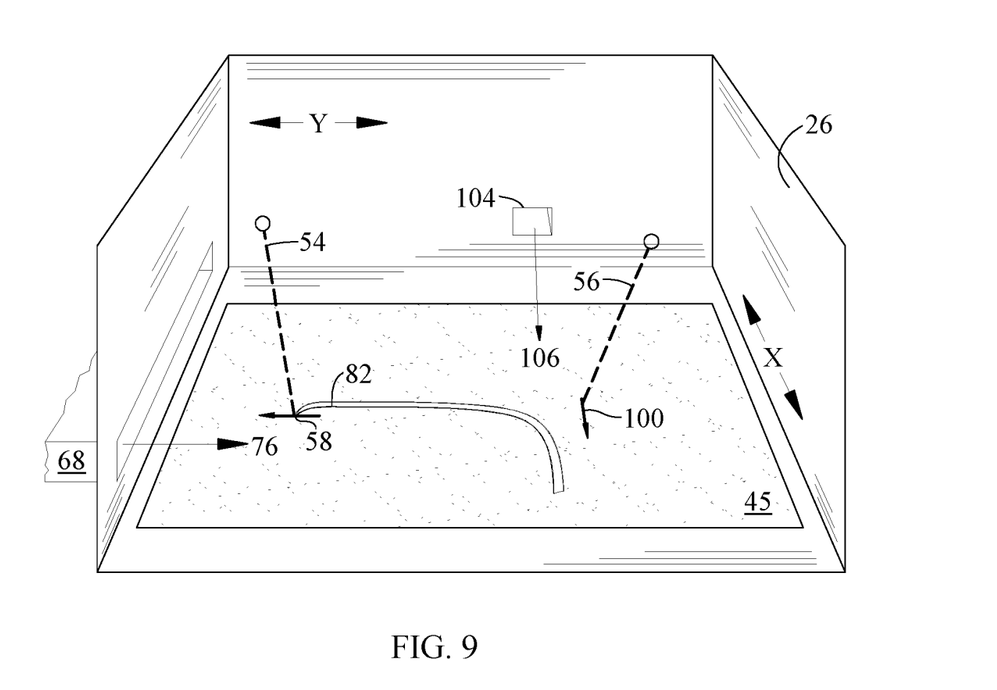
FIG. 9 is a schematic perspective view of an additive manufacturing build chamber showing a gas flow from inlet ducts being used to steer the path of an emissions plume.

Another possible method involves providing a means for vectoring of the gas flow 76. This may be accomplished, for example by providing turning vanes or similar (not shown) in the inlet duct 68. Alternatively, as shown in FIG. 9, the housing 26 may be provided with one or more additional inlet ducts 104 coupled to the gas flow system 62. This additional inlet duct 104 is aligned perpendicular to the axis of the inlet duct 68, i.e. parallel to the X-direction. Selective operation of the additional inlet duct 104 permits turning of the gas flow 76. Selective operation of the inlet duct 104 may be implemented by way of an independent fan (not shown) or appropriate valves or dampers (not shown) within the gas flow system 62.

In FIG. 9, build beam 54 is shown generating plume 82 and build beam 56 is shown traversing in intended path 100 which would intersect the plume 82. Using this method, additional gas flow (arrow 106) would be introduced through additional inlet duct 104 slightly before the time of predicted intersection with the plume 82, having the effect of turning the plume 82 away from the intended path 100. The build beam 56 would then be free to continue following the intended path 100. Subsequently, the gas flow through additional inlet duct 104 may be terminated.

In a more complex mode of operation, the flow through two or more inlet ducts such as ducts 68 and 104 may be varied to produce a coordinated effect, e.g. to produce two independently variable orthogonal flow components, resulting in an arbitrary desired flow velocity and/or direction of the plume 82.

Figure 10:
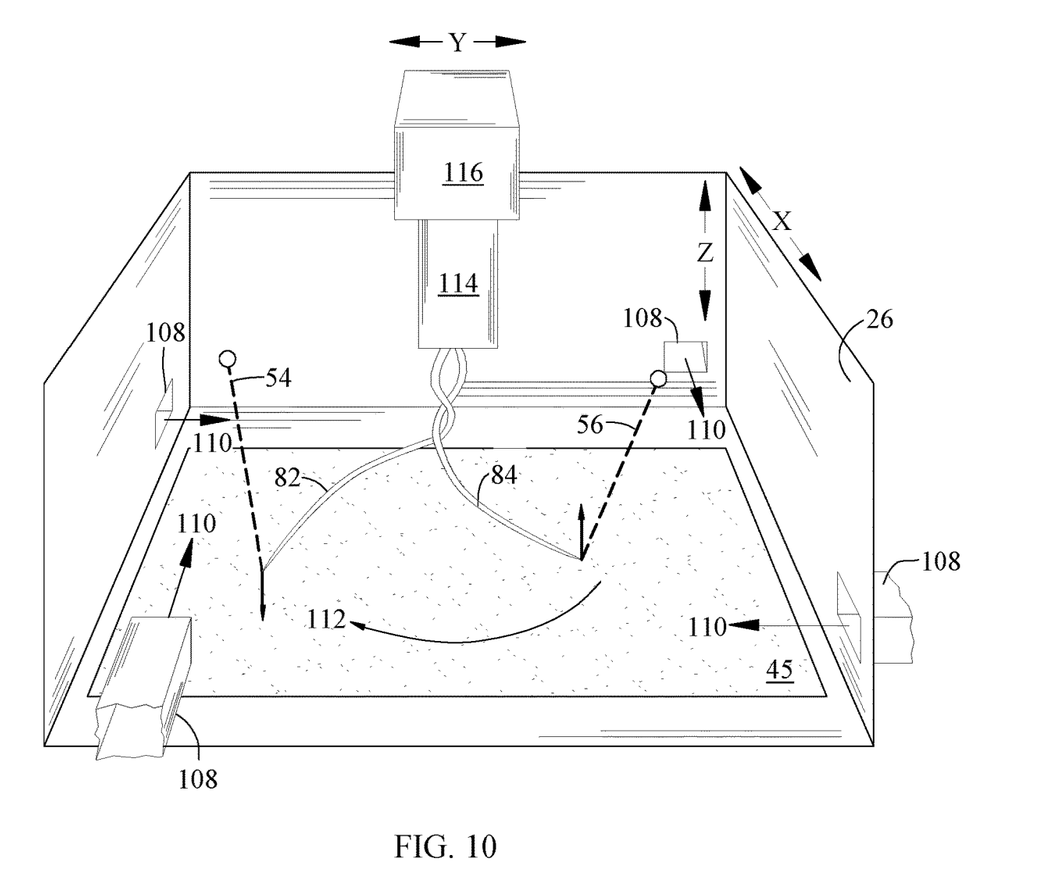
FIG. 10 is a schematic perspective view of an additive manufacturing build chamber showing a gas flow from inlet ducts being used to create a vortex flow pattern, and a suction device being used to remove emissions plumes from the chamber.

Another possible method involves establishing a continuous predictable vortex in the gas flow. As shown in FIG. 10, the housing 26 may be provided with two or more inlet ducts 108 arranged to produce rotating flow. In this example, one inlet duct 108 is provided in each of the corners of the housing 26, and the flow direction of each inlet duct 108 is oriented at a 90° angle to the closest adjacent inlet duct 108, creating gas flows 110.

Operation of the inlet ducts 108 will result in a large circulation pattern or vortex 112 in the gas flow which in turn will create a rotating trajectory of the plumes 82 and 84. The plumes 82 and 84 will be constantly moving over the build surface 45, in effect "clearing" any given location on the build surface 45 at regular intervals. The build beams 54, 46 can be steered to move over the build surface 45 into the cleared areas, "following" the movement of the vortex pattern.

In addition to or as an alternative to the use of inlet ducts 108 to produce vortex 112, a suction source may be provided to discourage the plumes 82, 84 away from the build surface 45 and the build beams 54, 56. In the example illustrated in FIG. 10, a suction duct 114 is positioned above the build surface 45 in an "overhead" position. The suction duct 114 is coupled to a suction source 116 such as an additional fan configured to produce an outward flow relative to the housing 26.

As shown in FIG. 10, the suction flow tends to move the plumes 82, 84 upwards or in the plus-Z direction away from the build surface 45. When combined with the vortex flow described above, the plumes 82, 84 tend to flow in a spiral or helix towards the suction duct 114.

Optionally, means such as actuators (not shown) may be provided may be provided to move the suction duct 114 in the X and Y directions. Movement of the suction duct 114 may be coordinated with the plume trajectory information described above so as to move the suction duct 114 to the most effective location during a build process.

The sensors and techniques described above for avoiding beam/plume interactions may be incorporated into an integrated process control method for the machine 10. Generally stated, the process control method includes using software with multiple sources of data to understand the build process and to leverage learning from one build to optimize subsequent builds in an automated process. This may be referred to as "machine learning".

Figure 11:
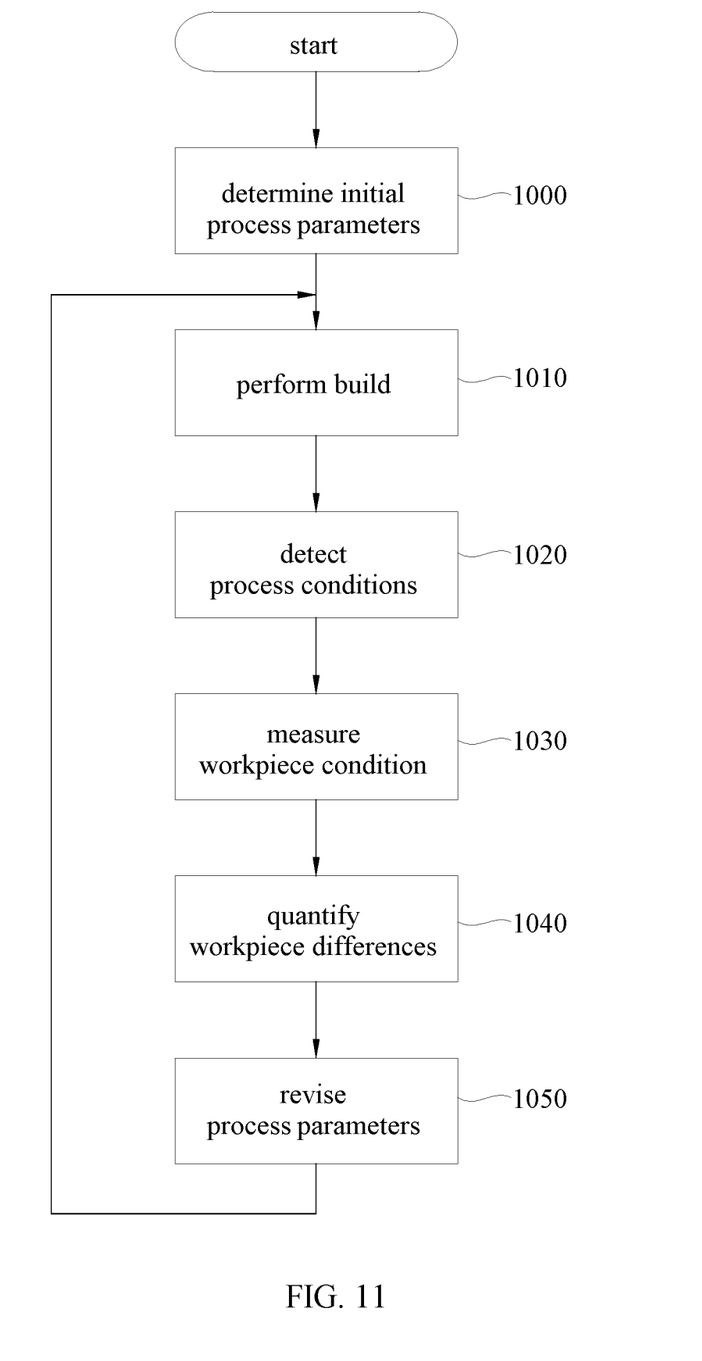
FIG. 11 is a block diagram of an exemplary process control method for the machine shown in FIG. 1.

FIG. 11 is a schematic block diagram of a method for developing optimized process parameters. At block 1000, a set of initial process parameters is selected. As used herein, "process parameters" can refer to any controllable aspect of the machine 10 and/or the gas flow apparatus 62. The initial process parameters could be determined manually by a human operator, or by reference to a predetermined or stored set of process parameters, or by simulation (e.g. modeling) of a build process, using software running on one or more computers.

An initial "build" of a workpiece may then be carried out using the additive build process described above, utilizing the initial process parameters. (block 1010).

During the initial build, multiple sensors may be used to detect process conditions (block 1020). As used herein, "process conditions" refers to any measurable aspect of the process, such as machine settings, physical conditions such as gas flow rates, plume mapping, thermal mapping, acoustic or mechanical sensors, etc. For example, the sensors and 77 and 79 described above may be used to detect a gas flow rates. As another example, the sensors 88 described above may be used for the purpose of plume mapping.

One or more other process sensors may be provided within the housing 26. Nonlimiting examples of process sensors include photodiodes, pyrometers, acoustic sensors, cameras, or spectrometers. Examples of process aspects that can be measured include but are not limited to melt pool size, melt pool electromagnetic emission, and melt pool acoustic emission. The information from the process sensors may be used as an additional data source for statistical process control or feedback control of the process, as described above. A generic process sensor 81 is shown schematically in FIG. 1.

Upon completion of the initial build, the workpiece 25 may be analyzed (block 1030) using one or more sensors to determine a workpiece condition. As used herein "workpiece condition" refers to any measurable aspect of the workpiece 25, such as surface finish, surface reflectivity, presence of discrete defects, and/or dimensional conformance to a pre-existing standard such as an engineering drawing or 3-D model. Nonlimiting examples of workpiece sensors include laser scanners, cameras, and optical scanners. A generic workpiece sensor 83 is shown in FIG. 1.

Once workpiece analysis is completed, software analysis may be performed (block 1040) to quantify differences between a measured workpiece condition and a desired workpiece condition. As one example, the workpiece surface finish may be measured and compared to a predetermined standard surface finish. As another example, the as-built dimensions of the workpiece 25 may be compared to acceptable dimensional tolerances contained in an engineering drawing or 3-D model.

Once this is analysis is complete, process parameters may be modified (block 1050) in order to change the process so as to improve the workpiece condition. This results in a set of revised process parameters. As one example, if the measured surface finish described above is rougher than desired, process parameters such as powder thickness increment, laser focus, and/or laser power may be modified to result in a smoother surface finish.

The techniques used to determine revised process parameters may include numerous methods such as: statistical process control, feedforward control, feedback control using proportional, proportional-integral, proportional-derivative, or proportional-integral-derivative control logic, neural network control algorithms, or fuzzy logic control algorithms. Various artificial intelligence ("AI") and/or machine learning algorithms and/or or neural network configurations may be used.

After the process parameters are modified, a subsequent build may be performed (block 1010) using the revised process parameters.

The entire process may be repeated to achieve an optimized set of process parameters resulting in a final part condition. By making improvements in each iteration, it is expected that the workpiece condition will rapidly converge to an optimized part fully conforming with the applicable engineering standards.

Once the optimized set of process parameters as been determined, workpieces can be manufactured using those process parameters. Optionally, the optimized process parameters may be "locked in" or protected from further changes in order to prevent process variation during subsequent builds. This may be desirable in a manufacturing environment. Alternatively, the process control method depicted in FIG. 11 can continue for the purposes of quality control and/or trend monitoring and/or automatic compensation. For example, changes in performance of the machine 10 or gas flow apparatus 62 (for example due to normal variation, wear, and/or damage) would be detected in block 1020 and/or 1030 of the process and can be automatically compensated for in steps 1040 and 1050 by modifying one or more process parameters.

The process control method may include establishing one or more predetermined limits related to the workpiece 25, such as a maximum permissible deviation from a surface finish or dimensional tolerance. These may be referred to as "workpiece condition limits".

The process control method may include taking a discrete action in response to one or more workpiece condition limits being exceeded, such as providing a visual or audible alarm to a local or remote operator.

The process control method may include stopping the build process in response to one or more workpiece condition limits being exceeded. This is another example of a discrete action.

The process control method may include monitoring the condition or "health" of the machine 10. For example, if one or more process parameters deviate beyond the system's ability to compensate because of machine wear or damage, the system could indicate provide a visual or audible alarm to a local or remote operator indicating the need for corrective action. Corrective action could take the form of machine maintenance or repairs.

The operation of the apparatus described above including the machine 10 and gas flow apparatus 62 may be controlled, for example, by software running on one or more processors embodied in one or more devices such as a programmable logic controller ("PLC") or a microcomputer (not shown). Such processors may be coupled to the sensors and operating components, for example, through wired or wireless connections. The same processor or processors may be used to retrieve and analyze sensor data, for statistical analysis, and for feedback control. As used herein, the term "controller" or "electronic controller" refers collectively to the device or devices used to control the operation of the machine 10 and gas flow apparatus 62 as well as to run the software applications including the various algorithms described herein.

The method described herein has several advantages over the prior art. In particular, it enables the use of multiple energy beams or rapidly-scanned energy beams in order to speed up an additive manufacturing process.

It will automate additive manufacturing process development and process control to continually improve build speed and workpiece conformance. It is capable of rapidly integrating a process to provide an optimized fully-conforming workpiece.

The foregoing has described an method for process control in an additive manufacturing process. All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying potential points of novelty, abstract and drawings), or to any novel one, or any novel combination, of the steps of any method or process so disclosed.

What is claimed is:

1. A method of controlling an additive manufacturing process, the method comprising:
   selectively fusing, with at least one energy beam, a powder contained in an additive manufacturing machine having a gas flow therein;
   performing a build process to form a workpiece using a set of initial process parameters;
   sensing one or more process conditions while building the workpiece, wherein the one or more process conditions includes a plume trajectory of at least one plume generated by interaction of the at least one energy beam and the powder;
   sensing a condition of the finished workpiece;
   controlling the build process with an electronic controller;
   using the electronic controller, comparing the condition of the finished workpiece to a predetermined standard;
   using the electronic controller to implement a software process to change one or more of the initial process parameters to define a set of revised process parameters configured to avoid interaction between the at least one energy beam and the at least one plume; and
   performing a subsequent build process using the revised process parameters.

2. The method of claim 1 wherein the sensed process conditions further include at least one of: thermal mapping, and gas flow.

3. The method of claim 1 further comprising using the electronic controller for closed-loop control of one or more process parameters based on the sensed process conditions.

4. The method of claim 1 further comprising taking a discrete action in response to the measured workpiece condition exceeding one or more predetermined workpiece condition limits.

5. The method of claim 1 further comprising changing at least one process parameter of the additive manufacturing process in response to a change in performance of the additive manufacturing machine.

6. The method of claim 5 wherein the change in performance is caused by wear or damage of the additive manufacturing machine.

7. A method of making a workpiece, comprising:
   depositing a powdered material in a build chamber disposed in a housing, while using a gas flow apparatus coupled in fluid communication with the housing to provide a gas flow over the powder;
   in the presence of the gas flow, directing one or more energy beams to selectively fuse the powdered material in a pattern corresponding to a cross-sectional layer of the workpiece, wherein interaction of the one or more energy beams with the powdered material generates one or more plumes entrained in the gas flow, wherein the build process is conducted using a set of initial process parameters;
   sensing a condition of the finished workpiece;
   sensing one or more process conditions while building the workpiece, wherein the one or more process conditions includes a plume trajectory;
   using an electronic controller, comparing the condition of the finished workpiece to a predetermined standard;

using the electronic controller to implement a machine learning algorithm to change one or more of the initial process parameters to define a set of revised process parameters configured to avoid interaction between the one or more energy beams and the one or more plumes; and repeating the steps of fusing the powdered material to make a workpiece, using the revised process parameters.

8. The method of claim 7 wherein the sensed process conditions further include at least one of: thermal mapping, and gas flow.

9. The method of claim 7 further comprising using the electronic controller for closed-loop control of one or more process parameters based on the sensed process conditions.

10. The method of claim 7 further comprising taking a discrete action in response to the measured workpiece condition exceeding one or more predetermined workpiece condition limits.

11. The method of claim 7 further comprising changing at least one process parameter of the additive manufacturing process in response to a change in performance of the additive manufacturing machine.

12. The method of claim 11 wherein the change in performance is caused by wear or damage of the additive manufacturing machine.

13. The method of claim 1, further comprising distinguishing, with the electronic controller, the at least one plume from the gas flow.

14. The method of claim 7, further comprising distinguishing, with the electronic controller, the one or more plumes from the gas flow.

* * * * *